United States Patent [19]

Bergum

[11] Patent Number: 4,830,935

[45] Date of Patent: May 16, 1989

[54] LITHIUM CELL ANTI-REVERSAL PROTECTION

[75] Inventor: Bernard C. Bergum, Madison, Wis.

[73] Assignee: Rayovac Corporation, Madison, Wis.

[21] Appl. No.: 70,980

[22] Filed: Jul. 8, 1987

Related U.S. Application Data

[63] Continuation-in-part of Ser. No. 750,041, Jun. 27, 1985, abandoned, which is a continuation of Ser. No. 507,665, Jun. 24, 1983, abandoned.

[51] Int. Cl.$^4$ .......................... H01M 4/36; H01M 2/16
[52] U.S. Cl. ..................................... 429/101; 429/209; 429/246; 429/247; 29/623.1

[58] Field of Search ............... 429/129, 209, 246, 247, 429/101; 29/623.1

[56] References Cited

U.S. PATENT DOCUMENTS 3,539,396  11/1970  Wagner ........................... 429/247 X
4,622,277  11/1986  Bessel et al. ........................ 429/94

Primary Examiner—Stephen J. Kalafut
Attorney, Agent, or Firm—Kenyon & Kenyon

[57] ABSTRACT

A thionyl chloride electro-chemical cell includes a porous metal member electrically connected to the cathode and interposed between the cathode and the lithium anode.

18 Claims, 1 Drawing Sheet

LITHIUM CELL ANTI-REVERSAL PROTECTION

This application is a continuation-in-part of Ser. No. 750,041, filed June 27, 1985, now abandoned, which was a continuation of Ser. No. 507,664, filed June 24, 1983, now abandoned.

FIELD OF INVENTION

The present invention is directed to lithium-thionyl chloride electrochemical cells and, more particularly, to a means for preventing explosions of said cells under voltage reversal conditions.

BACKGROUND OF INVENTION

Lithium-thionyl chloride cells are particularly advantageous sources of electrochemical power. Such electrochemical cells provide reasonably flat discharge curves at temperatures down to about −30° C., with only very slight voltage delay at low current densities. Moreover, it is well known that because of the unique properties of lithium—it has the highest electrode potential of any element, while at the same time, it is the lightest metallic element—lithium battery systems afford exceptional capacity in proportion to the weight of the anode.

In lithium-thionyl chloride cells of the prior art, a porous carbaceous material, usually a carbon black and Teflon mixture is used as the cathodic current collector. The electrolyte, usually a combination of a lithium halide with a Lewis acid, is dissolved in the cathodic liquid depolarizer, i.e., the thionyl chloride. The cathodic side of the cell is protected from the lithium anode by a porous separator stable in thionyl chloride, such as non-woven fibrous glass, fibrous aluminum oxide or other non-conductive, porous materials which are chemically stable in lithium-thionyl chloride cells.

Such prior art lithium-thionyl chloride cells have found many practical utilities, including the power source for cardiac pacemakers. Other practical applications, which have taken advantage of the high energy density and the favorable low temperature characteristics of lithium-thionyl chloride cells include balloon and rocket borne meteorological radiosondes, emergency locating transmitters, underwater instrumentation and powering cryogenic experiment. However, such prior art lithium-thionyl chloride cells often present safety problems, especially when cells are used serially in batteries. It is well known and documented that under conditions of voltage reversal, lithium-thionyl chloride cell can undergo electrochemical and chemical reaction which cause cell bulging, excess heating, or even explosions. In U.S. Pat. No. 4,307,160, the explosive force which can occur in lithium-thionyl chloride cells during voltage reversal is likened to an "incendiary bomb."

This problem encountered during cell reversal is believed to be caused by the formation of lithium dendrites which plate across the separator to the surface, or into the mass, of the porous carbon current collector thereby creating a electrical pathway between the lithium and the carbon. The intermixing of the lithium and the carbon, upon the application of current during cell reversal, generates excess heat which can cause a precipitous rise in internal cell pressure. Additionally, the presence of elemental sulfur and sulfur dioxide, the by-products of chemical and electrochemical reactions in the cell, also contribute to the generation of heat and the increase in internal cell pressure. Importantly, as pointed out in U.S. Pat. No. 4,307,160, voltage reversal will take place when the batteries are connected in series and may occur even though reasonable precautions seemingly have been used.

A well known solution to the problem of explosions in lithium—thionyl chloride electrochemical cells is to provide for a safety vent in the cell housing. While such vents may prevent the cell from exploding under voltage reversal conditions, in many situations venting is unacceptable since the environment around the cell will become contaminated by the highly toxic fumes.

Accordingly, it is an object of the present invention to provide an improved lithium-thionyl chloride cell which will not undergo electrochemical and chemical reactions under voltage reversal conditions. It is a further object of the present invention to provide for a mechanism within a lithium-thionyl chloride cell which, during voltage reversal will prevent the explosion of the cell while preventing the contamination of the surrounding atmosphere. Yet another object of the present invention is to provide for a lithium-thionyl chloride cell which is safe under cell reversal conditions, yet easy to manufacture. The foregoing and additional objects will become more fully apparent with the following description.

SUMMARY OF INVENTION

The present invention provides for a lithium-thionyl chloride cell having a porous metallic member interposed between the lithium anode and the carbon current collector and in electrical contact with the positive portion of the cell. Under conditions of voltage reversal, the lithium will plate upon the porous metal member and form lithium dendrites bridging the porous metal member and the anodic materials. However, the porous metal member prevents the contact and/or the intermixing of carbon with the highly reactive lithium. And since the porous metal member is in electrical contact with the positive portion of the cell, upon being plated with lithium, the porous metal member allows the cell to act as a resistor, thus preventing the potentially explosive intermixing of carbon and lithium. The current is shunted harmlessly through the cell from the porous metal member to the negative portion of the cell. It is a necessary condition of the present invention that the porous metal member is in electrical contact with the electropositive portion of the cell. If the porous metal member touches the surface of the lithium, the cell is directly electrically shorted, hence rendering the cell useless. Of course, it is important for porous metal member to be stable in thionyl chloride.

DETAILED DESCRIPTION OF THE INVENTION

Figure 1:
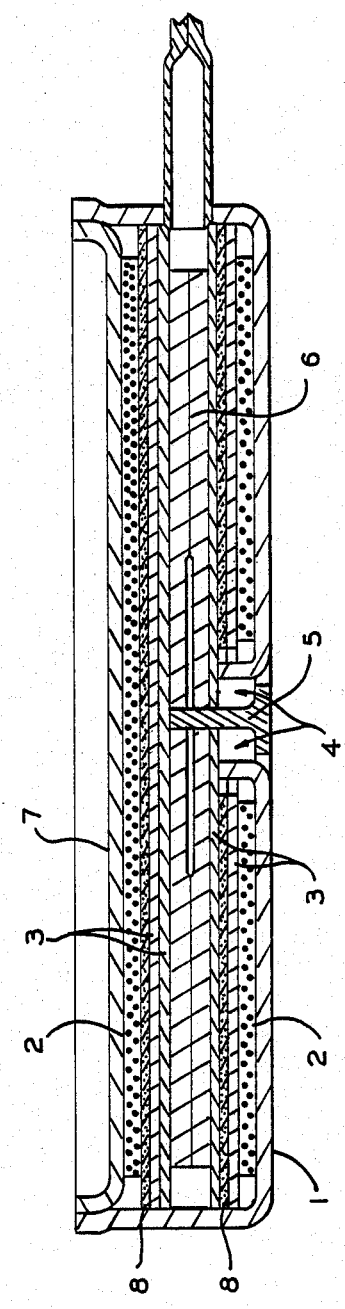
FIG. 1 shows the lithium-thionyl chloride cell of the present invention.

In carrying out the present invention, a porous metal member in electrical contact with the positive portion of the cell is interposed between the cathodic and anodic sides of a lithium thionyl chloride cell. As shown in FIG. 1, the cathodic side of the cell (2) is comprised of a porous carbon current collector and thionyl chloride, in to which a suitable electrolyte has been absorbed. Typically the anode consists of lithium or a lithium alloy (6) and the non-metallic separators (3) consist of a thionyl-chloride resistant material such as a glass fiber sheet. Depending upon the configuration of the cell, the porous metal member (8), usually in the form of a thin, porous membrane, may be affixed to the separator adjacent to the carbon current collector or it may substitute for a layer of such a separator. Alternatively, it may be sandwiched between two layers of separators. In all cases, the porous metal member must be in electrical contact with the positive portion of the cell. When the positive portion of the cell comprises the metallic container (1), such as in FIG. 1, the porous metallic member must be in electrical contact with the metallic containers. By substituting for a layer of the separator, internal active volume is maintained and cell capacity is maximized. While the porous metal member may contact the surface of the cathode current collector, it cannot be in physical contact with the lithium anodic material.

The porous member advantageously is made of nickel or stainless steel, since such materials are commercially available, although any metal which is stable in thionyl chloride can be used. Thus, nickel alloys such as nickel-copper alloys, nickel-iron alloys, iron, lead, tantalum, etc. may be employed. The member may have a porosity of about 90% to about 15%, by volume, and may be as thin as 5 microns and up to about 2.5 mm when in sheet-like configuration. Pore size of the voids in the member is between about 1 and about 200 microns whereby the member is ionically conductive as well as electronically conductive.

Materials which can be used as the porous metal member in accordance with the invention include porous powder metallurgy products such as porous sintered nickel sheet having a mean pore diameter of 6 to 12 microns, with 60% of the pores in the range of 4 to 15 microns, a porosity of 80% to 87% and a thickness of 0.7–0.8 mm. Perforated stainless steel (U.S. Pat. No. 3,352,769) having a pore diameter of 10–40 microns and a thickness of 12.7 to 127 microns and ultrathin perforated nickel foil having an average pore diameter of 200 microns, a thickness of 4 to 200 microns and a porosity of 15 to 40% may also be used.

The following example clearly demonstrates that under voltage reversal conditions, the performance of cells of the present invention superior to prior cells constructed without porous metal members.

EXAMPLE

Figure 2:
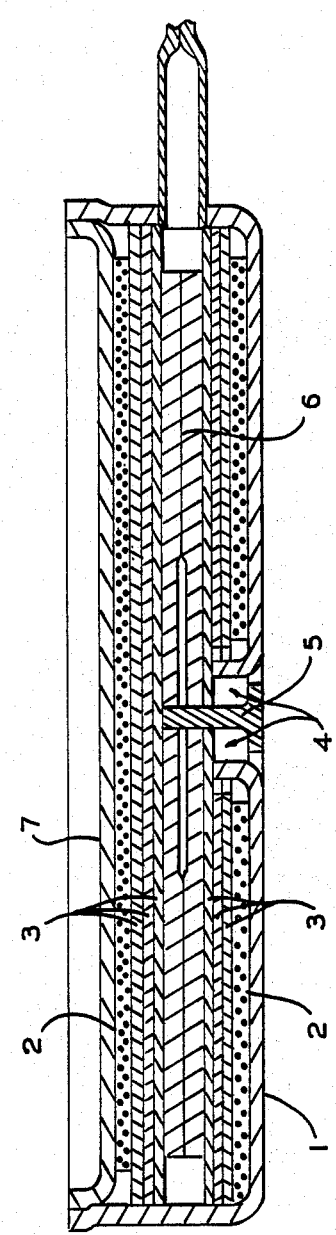
FIG. 2 shows a prior art lithium-thionyl chloride cell.

Rectangular lithium-thionyl chloride cells were constructed having a length to thickness ratio in the long direction of about 6:1. As shown in FIGS. 1 and 2, the cells had a lithium anode (6) centrally located with carbon current collectors (2) adjacent each internal major face. Multiple layered separators (3) were located between the lithium anode and the porous cathode current collector. The lid (7) and the can (1) containing the negative terminal (5) were of stainless steel and welded around the perimeter to form a hermetic seal. A connector to the lithium was led to the center of the can face to form the negative connection to the cell. The connector was sealed with an insulating glass (4) to form a hermetic seal in the can.

Two test cells had a layer of separator adjacent the current collector replaced with porous sintered nickel sheet (8) about 0.7–0.8 mm. thick. The cells were tested to current reversal using an impressed current of 500 mA. Reversal and shorting took place in about 20 minutes. Reversal was continued for 40–60 minutes during which time the cells maintained a constant voltage of −0.02 volts, typical of a shorted cell.

Examination of the cell components after test showed isolated point deposits randomly occurring between the lithium and porous nickel sheet. However, there was no lithium penetration of the porous nickel sheet.

The capacity of the test cells was essentially the same as control cells. The control cells (made without the porous nickel layer) also shorted in about the same length of time, with shorting from the lithium to the inwardly extruding seal flange at which point the distance to the lithium anode is short. One control cell without the nickel protective barrier overheated to 140° C. on reversal.

The invention could also be applicable to other lithium systems such as $Li/MnO_2$ and $Li/CF_x$. The present invention is independent of cell configuration and is capable of easy and reproducible manufacture.

Although the present invention has been described in conjunction with preferred embodiments, it is to be understood that modifications and variations may be resorted to without departing from the spirit and scope of the invention, as those skilled in the art will readily understand. For example, various lithium alloys may be employed in producing cells of the type to which this invention is directed. Such modifications and variations are considered to be within the purview and scope of the invention and appended claims.

I claim:

1. A thionyl chloride electrochemical cell having a negative portion comprising a lithium anode and a negative terminal, a positive portion comprising a porous carbon cathode current collector, thionyl chloride and a positive terminal and an electrolyte solute dissolved in said thionyl chloride, said cell further comprising one or more non-metallic separators interposed between said negative portion of the cell and said porous carbon cathode current collector and a porous metal member electrically connected to said positive portion of the cell and interposed between said negative portion of the cell and said carbon cathode current collector, but not electrically connected to said negative portion of said cell.

2. The electrochemical cell in accordance with claim 1, wherein the porous metal member is a thin membrane of a material selected from the group consisting of nickel, stainless steel, iron, lead, tantalum, nickel-copper alloys and nickel-iron alloys.

3. The electrochemical cell in accordance with claim 2, wherein the porous metal member has a porosity of about 15–90% by volume; a pore size between about 1–200 microns; and a thickness of between about 5 microns and 2.5 mm.

4. The electrochemical cell in accordance with claim 1, wherein the porous metal member is in physical contact with, and covers essentially the entire portion of, the current collector surface exposed to the thionyl chloride.

5. The electrochemical cell in accordance with claim 1, wherein the porous metal member is interposed between two of the said non-metallic separators.

6. The electrochemical cell in accordance with claim 1, wherein the porous metal member is sintered nickel having a mean pore size of about 6–12 microns; a porosity of about 80–87%; and a thickness of about 0.7 to 0.8 mm.

7. The electrochemical cell in accordance with claim 1, wherein the porous metal member is perforated stainless steel having an average pore diameter of about 10-40 microns and a thickness of 12.7 to 127 microns.

8. The electrochemical cell in accordance with claim 1, wherein the porous metal member is ultrathin perforated nickel foil having an average pore diameter of about 200 microns; a thickness of about 4-200 microns; and porosity of about 15-40% by volume.

9. The electrochemical cell as in claim 1, where in said positive portion further comprises a metallic cell container.

10. The electrochemical cell as in claim 9, wherein said porous metal member is electrically connected to said metallic cell container.

11. The method of protecting from adverse effects under reverse voltage conditions a lithium-thionyl chloride cell having a metallic container, a negative portion comprising a lithium anode, a positive portion comprising a porous cathode current collector of carbon and thionyl chloride, an electrolyte solute dissolved in said thionyl chloride and one or more non-metallic separators interposed between said negative portion of the cell and said carbon cathode current collector of said cell, the improvement comprises interposing between said lithium anode and said carbon cathode current collector, a porous metallic member which is stable when in contact with thionyl chloride and is in electrical contact with said positive portion of the cell, but not in contact with said negative portion of the cell, whereby, under conditions of voltage reversal, deposition of lithium dendrites upon or into said carbon cathode current collector is prevented.

12. The method in accordance with claim 11, wherein said porous metallic member interposed between said anode and said cathode is selected from the group consisting of nickel and stainless steel.

13. The method in accordance with claim 11, wherein said porous metallic member interposed between said anode and said cathode is sintered nickel powder.

14. The method in accordance with claim 11, wherein said porous metallic member is in physical contact with said porous cathode current collector.

15. The method in accordance with claim 11, wherein said porous metallic member is affixed to one of the said non-metallic separators.

16. The method in accordance with claim 11, wherein said porous metallic member is interposed between two of the said non-metallic separators.

17. The method in accordance with claim 11, wherein said positive portion of said cell further comprises said metallic container.

18. The method in accordance with claim 9, wherein said porous metallic member is in electrical contact with said metallic container.

* * * * *

UNITED STATES PATENT AND TRADEMARK OFFICE
CERTIFICATE OF CORRECTION

PATENT NO. : 4,830,935

DATED : May 16, 1989

INVENTOR(S) : Bernard C. Bergum

It is certified that error appears in the above-identified patent and that said Letters Patent is hereby corrected as shown below:

| Column | Line | |
|---|---|---|
| 1 | 6 | Please delete "507,664" and insert --507,665--. |
| 3 | 45 | Please insert --is-- after "invention". |
| 6 | 24 | Please delete "9" and insert --17--. |

Signed and Sealed this

Thirtieth Day of January, 1990

Attest:

JEFFREY M. SAMUELS

Attesting Officer     Acting Commissioner of Patents and Trademarks